United States Patent
Froloff et al.

(10) Patent No.: US 7,167,789 B1
(45) Date of Patent: Jan. 23, 2007

(54) VARIABLE COMPRESSION RATIO INTERNAL COMBUSTION ENGINE

(76) Inventors: Walt Froloff, 273D Seardige Rd., Aptos, CA (US) 95003; Kenneth C Miller, 402 W. Seacliff Dr., Aptos, CA (US) 95003

( * ) Notice: Subject to any disclaimer, the term of this patent is extended or adjusted under 35 U.S.C. 154(b) by 53 days.

(21) Appl. No.: 11/129,948

(22) Filed: May 16, 2005

(51) Int. Cl.
*G06F 19/00* (2006.01)
*F02D 13/00* (2006.01)

(52) U.S. Cl. .................. 701/101; 701/115; 123/90.15; 123/305; 123/348

(58) Field of Classification Search ........ 701/101–105, 701/110, 113; 123/90.11, 90.15, 90.16, 90.17, 123/295, 305, 316, 347, 348, 48 R, 78 R
See application file for complete search history.

(56) References Cited

U.S. PATENT DOCUMENTS

| | | | | |
|---|---|---|---|---|
| 5,195,469 | A * | 3/1993 | Syed | 123/48 A |
| 5,477,822 | A * | 12/1995 | Haghgooie et al. | 123/286 |
| 6,938,593 | B2 * | 9/2005 | Magner et al. | 123/90.16 |
| 6,994,061 | B2 * | 2/2006 | Magner et al. | 123/90.15 |
| 7,059,280 | B2 * | 6/2006 | Nohara et al. | 123/48 D |
| 2002/0092488 | A1 * | 7/2002 | Aoyama et al. | 123/90.16 |
| 2003/0019448 | A1 * | 1/2003 | Aoyama et al. | 123/90.16 |
| 2004/0083992 | A1 * | 5/2004 | Nohara et al. | 123/78 E |
| 2005/0103290 | A1 * | 5/2005 | Magner et al. | 123/90.16 |
| 2005/0273245 | A1 * | 12/2005 | Chen et al. | 701/111 |

* cited by examiner

*Primary Examiner*—John T. Kwon
(74) *Attorney, Agent, or Firm*—Walt Froloff

(57) ABSTRACT

A variable compression ratio internal combustion engine is programmably configured to operate in a plurality of compression ratios. Internal combustion engines with electronically controlled engine components that include electronic valve operation are programmed to operate individual engine cylinders with component states and stoke sequences that provide variable compression ratios by creation of a virtual cylinder within a physical cylinder. Cylinder volume dictates maximum compression ratio, which acts as a ceiling for the variable compression ratio that can be provided.

5 Claims, 8 Drawing Sheets

VCR Stroke Sequence

CR  = Maximum 21:1 cylinder with 1 unit above TDC

PTR = (Length of Piston Travel from TDC)/(Total Stroke Length)

IVOA = Degrees from TDC

| CR 601 | PTR 603 | IVOA 605 |
|---|---|---|
| 8 | 0.35 | 72.54 |
| 9 | 0.40 | 78.47 |
| 10 | 0.45 | 84.26 |
| 11 | 0.50 | 90.00 |
| 12 | 0.55 | 95.74 |
| 13 | 0.60 | 101.54 |
| 14 | 0.65 | 107.46 |
| 15 | 0.70 | 113.58 |
| 16 | 0.75 | 120.00 |
| 17 | 0.80 | 126.87 |
| 18 | 0.85 | 134.43 |
| 19 | 0.90 | 143.13 |
| 20 | 0.95 | 154.16 |
| 21 | 1.00 | 180.01 |

FIG. 6

FIG.7  SI Timing Diagram

VARIABLE COMPRESSION RATIO INTERNAL COMBUSTION ENGINE

BACKGROUND

A "compression ratio" of an internal combustion engine is defined as the ratio of the volume in a cylinder above a piston when the piston is at bottom-dead-center (BDC) to the volume in the cylinder above the piston when the piston is at top-dead-center (TDC). The higher the compression ratio, the more the air and fuel molecules are mixed and compressed, resulting in increased engine efficiency. This in turn results in improved fuel economy and a higher ratio of output energy versus input energy of the engine.

In conventional internal combustion engines however, the compression ratio is fixed for all cylinder units and cannot be changed individually to accommodate temperature and other cylinder state differences. This notwithstanding, some variable compression ratio (VCR) internal combustion engines have been developed to vary the clearance volume of a cylinder in order to achieve improved fuel economy and increased engine power performance in some engines mechanically. Such VCR engines are designed to have a higher compression ratio during low load conditions, and a lower compression ratio during high load conditions. Known techniques include using "sub-chambers" and "sub-pistons" to vary the volume of a cylinder, U.S. Pat. Nos. 4,246,873 and 4,286,552, varying the actual dimensions of all or a portion of a piston attached to a fixed length connecting rod, U.S. Pat. No. 5,865,092, and varying the actual length of a connecting rod, U.S. Pat. No. 5,724,863.

Other techniques for constructing variable compression into internal combustion engines include the use of eccentric rings or bushings either at the lower "large" end of a connecting rod or the upper "small" end of the connecting rod for varying the effective length of the connecting rod or height of a reciprocating piston. U.S. Pat. Nos. 5,417,185, 5,562,068 and 5,960,750 and Japanese Publication JP-03092552 disclose devices that include eccentric rings. These eccentric ring devices, however, are undesirable in that each eccentric ring must be rotated 180 degrees before one of the desired operating modes or positions is engaged. As a result, locking of the eccentric ring in a proper position may not occur within an optimum period of time, thereby leaving the effective length of the device and consequently the compression ratio of an associated cylinder in an undesired intermediate state.

U.S. Pat. No. 6,668,768 describes a connecting rod assembly that may be transitioned between two or more compression modes without requiring rotation of an eccentric ring member about a crankpin or wrist pin. The connecting rod assembly of the invention is configured to vary a compression ratio of an internal combustion engine having a crankshaft, a piston and special assemblies with a first portion connected to the crankshaft and having a cylindrical aperture with a second portion adapted to be connected to the piston and movable with respect to the first portion. In addition, the assembly includes a locking element movable between an unlocked position and a locked position for locking the second portion at a first position relative to the first portion. U.S. Pat. No. 6,675,087 describes a variable compression ratio apparatus with compression ratio operating modes based in part on driveline surge, surge tolerance, compression ratio operating modes. Others propose hydraulic methods to extend the connecting rods to provide compression ratio variability or multi-link type piston-crank mechanism enabling a compression ratio to be varied by changing attitude of the links.

The common innovative thread in all the above solutions is that they are all mechanical changes to the engine or engine components. The incremental costs are additional mechanical contrivances for reconfiguring rods, crankshafts and engine heads, hardware assemblies, mechanical process gyrations. The benefits are fixed designs with a limited range of discrete compression ratio operating modes. What is needed are more expansive and flexible ways to change the compression ratio in an internal combustion engine in real-time. What are needed are more precise methods of changing a compression ratio over a larger range of compression ratios and methods of controlling changing compression ratios through a continuous range that can be selected and implemented dynamically.

Engine Developments

The internal combustion engine has seen thousands of improvements and developments. Some of the latest improvements include fuel efficiency, pollution reduction, electronic ignition, fuel mixture heating or cooling, fuel injection, variable displacement, air-fuel mixing and digital controlling of hydraulically actuated intake/exhaust valves. Camless hydraulically driven intake and exhaust valves and electronically controlled hydraulic fuel injectors are among the very latest innovations to impact internal combustion engines.

A computer control system which provides commands to electronic assemblies can finely control and vary valve actuation, fuel injection and ignition. Electronic assemblies process commands and feedback signals from these devices to manage engine operation. Camless valve control allows engine control subsystems to vary timing, lift, and compression ratio in response to engine load, temperature, fuel/air mix, and other factors. The electronic valve-control system improves performance while reducing emissions.

There are several methods of camless valve control. Sturman, U.S. Pat. No. 6,360,728 Control Module for controlling hydraulically actuated intake/exhaust valves and fuel injection, claim fast-acting electro-hydraulic actuators which provide mechanical means for valve actuation under the control of an electronic assembly. Solenoid actuated two-way spool valves can also be actuated by digital pulses provided by an electronic assembly. Camless technology brings the internal combustion engine under even more electronic control potential and away from inflexible mechanical controls.

Spark Ignition (SI) Engine

Spark ignition (SI) engine operation involves ignition of a homogeneous or stratified mixture of air and readily vaporized high octane fuel, such as gasoline, using an electrical discharge (spark) from one or more ignition devices such as a sparkplug, located in the combustion chamber of the engine.

Ignition and combustion of the air/fuel mixture in SI engines is relatively slow, particularly at low loads, resulting in less than optimal thermal efficiency and fuel efficiency since only a portion of the fuel's energy is released at the point of maximum compression. Combustion of the air/fuel mixture begins at the spark plug (under normal operating conditions). Since the flame has a single flame front, a finite period of time, which is dependent on many factors, is required for the flame (generated by the spark at the sparkplug) to propagate across the combustion chamber. The air/fuel mixture furthest from the spark plug is ignited substantially later than the air/fuel mixture near the sparkplug. During flame propagation the pressure in the combustion chamber increases. The compressed air/fuel mixture furthest from the flame front is compressed to higher and higher values awaiting the flame. If the compression pressure and corresponding temperature of the air/fuel mixture awaiting the flame is sufficient, as well as the exposure time, the air/fuel mixture will auto-ignite before the flame reaches it. Auto-ignition of the air/fuel mixture results in very rapid rates of combustion generating high combustion pressures, rates of combustion pressure rise and combustion knock, which may cause engine damage depending on many factors. SI engines employ high-octane fuels to minimize auto-ignition of the air/fuel mixture.

Ever since first working four-stroke engines, a fundamental limitation the internal combustion reciprocating engine has been the volume swept out by the piston has had to remain fixed. Thus, engine designers have had to build engines tuned to work most efficiently during periods of high loading. Since a vehicle does not spend all its time climbing hills or racing away from a stop, much of the time the engine is operating below peak demand, and below peak efficiency. Sweden's Saab Automobile SA conceived a concept they call the SVC engine Saab invented the "monohead," a way to vary cylinder volume without resorting to variable height pistons or eccentric connecting rod bearings. This assembly combines cylinder head and cylinder walls in a single unit. The monohead pivots on a pin inside the crankcase. On the side opposite the pin, an actuator rotates a cam, driving connecting rods to cant the monohead by as much as 4 degrees. Tilting the monohead to any spot along 4 degrees of arc adjusts engine compression to an infinite number of ratios between 8:1 and 14:1. These limitations are set by the tilting angle and supercharger air delivery.

Compression ratio sets the level to which a piston compacts a mix of air and fuel before a spark ignites it. A typical car engine runs at a fixed compression ratio, somewhere around 9.3:1. If the ratio could be changed continuously, an engine would run more efficiently at light loads with a reduced incidence of ignition knock at heavy loads. Increasing the compression ratio to as much as 14:1 for light loads is ideal, he said. For heavy loads, dropping the compression ratio as far as 8:1 nearly stops engine knock, the damaging agent in engines, altogether.

In mechanical designs using variable compression with a fixed stroke length, a naturally aspirated engine could only surpass the efficiency of a conventional engine by 4 or 5 percent. Saab found that they needed boost pressure from a supercharger, to appreciable increase engine power with variable compression. However, this was shown for SI engine, not compression ignition or homogeneous charge compression ignition or other types of engines.

SUMMARY OF THE INVENTION

A variable compression ratio internal combustion engine is programmably configured to operate in a plurality of compression ratios. The compression ratio is defined as the ratio of volume of ambient air compressed to the volume above the piston when the piston is at TDC. Internal combustion engines with electronically controlled engine components are programmed to operate individual engine cylinders with component states and stoke sequences that provide variable compression ratios for individual cylinder units independently.

This is accomplished with one or more cylinder units each with expanding and contracting cylinder volume and associated stroke sequences, with each cylinder unit having an electronically controllable intake valve component having multiple states under computer control, each cylinder unit having an electronically controllable exhaust valve component having multiple states under computer control, each cylinder unit having an electronic fuel injector component having multiple states under computer control, each cylinder unit having an air-fuel mixture ignition means for igniting an air-fuel mixture in the cylinder volume with ignition means under computer control, a computer usable medium, and a computer control system comprising computer readable program logic embodied in the computer usable medium for controlling one or more cylinder units with the steps of selecting cylinder component valve states corresponding to piston sweep of cylinder volume. The cylinder volume available for drawing air during the intake draws in air governed by electronic control valve open state to the cylinder volume creating a controllable variable compression ratio which is a function of intake valve open state duration during an intake stroke.

Aspects of the invention allow engine cylinder unit component states to be independently controlled based on information collected from sensors and known engine parameters. Thus, valve open states are programmably controlled to draw only the quantity of air programably selected for a particular compression ratio. The piston linear travel drawing air volume is programmably related to the valve open duration period to allow into the cylinder only as much air as the compression ratio is programmed to receive, forming a virtual cylinder within the selected cylinder unit. Cylinder design dictates maximum compression ratio which acts as a ceiling for the variable compression ratio that can be provided by controlling cylinder unit component state during piston intake and compression strokes.

BRIEF DESCRIPTION OF THE DRAWINGS

These and other features and advantages of the present invention will become more apparent to those skilled in the art from the following detailed description in conjunction with the appended drawings in which:

FIG. 6 is a table relating VCRICE compression ratio with piston travel ratio and intake valve degree from open from TDC in accordance with an embodiment of the present invention.

DESCRIPTION OF THE PREFERRED EMBODIMENT

Through decoupling and programably altering cylinder unit component states, a multi-stroke internal combustion engine is created to provide variable compression in cylinder units, forming virtual cylinders, independent of each other. As an aspect of the invention, using computer control, electronic fuel injection, electronic ignition means, and electronic intake and exhaust valve actuation of cylinder unit components, an internal combustion engine embodiment is electronically and independently controlled for fuel in, ignition timing, air in, exhaust out, and air-fuel mixture, independently and changeably in real-time to individual cylinders. Thus, by computer programmed control of cylinder unit components, an aspect of the invention reconfigures an internal combustion engine's valve open duration for a programmed volume of intake air to provide a compression ratio related to the computer controlled intake valve open duration.

Variable Compression Ratio Internal Combustion Engine

Figure 1:
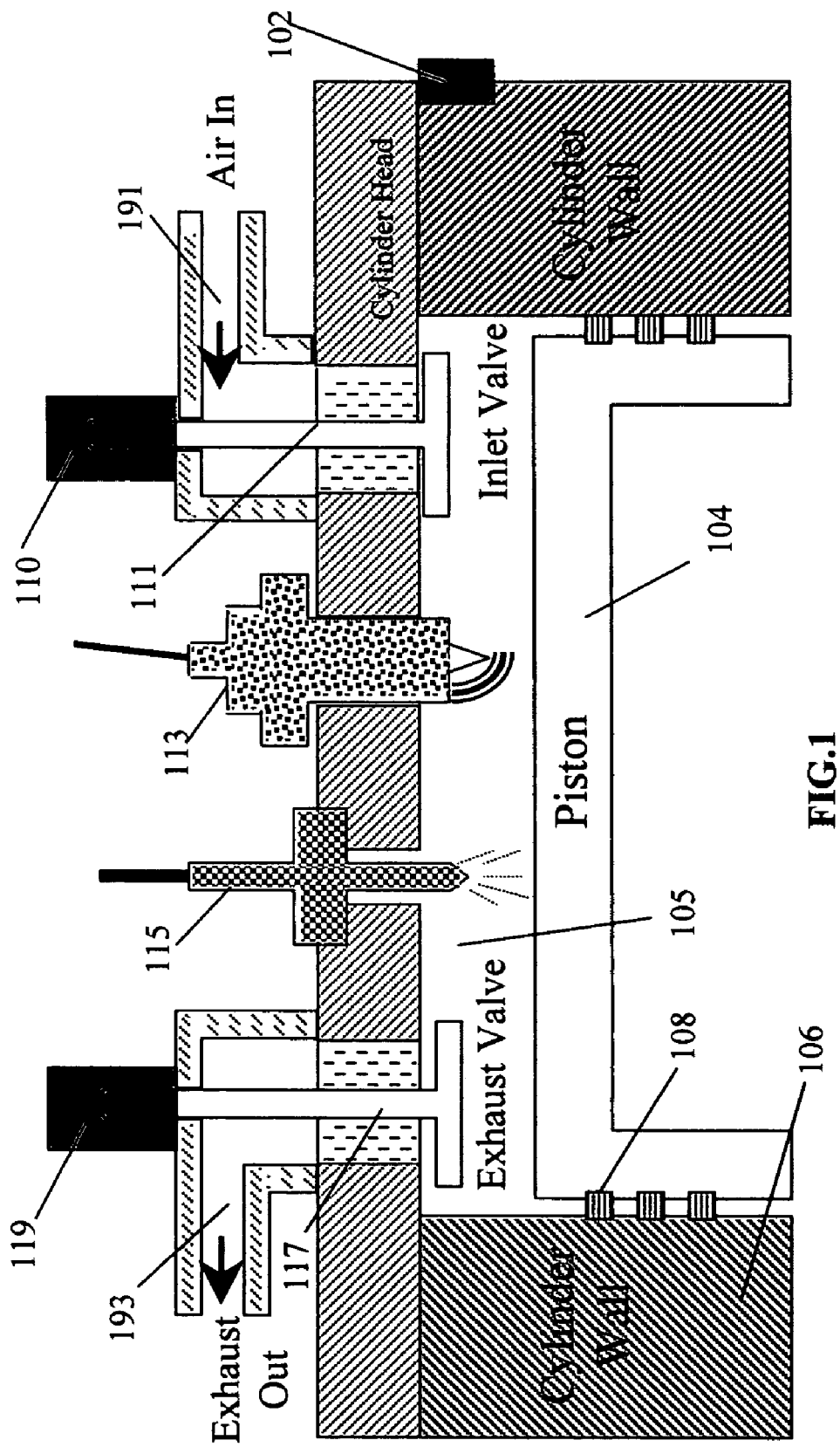
FIG. 1 is an engine cutout view illustrating a Variable Compression Ratio Internal Combustion Engine (VCRICE) engine cylinder unit in accordance with an embodiment of the present invention.
Figure 2:
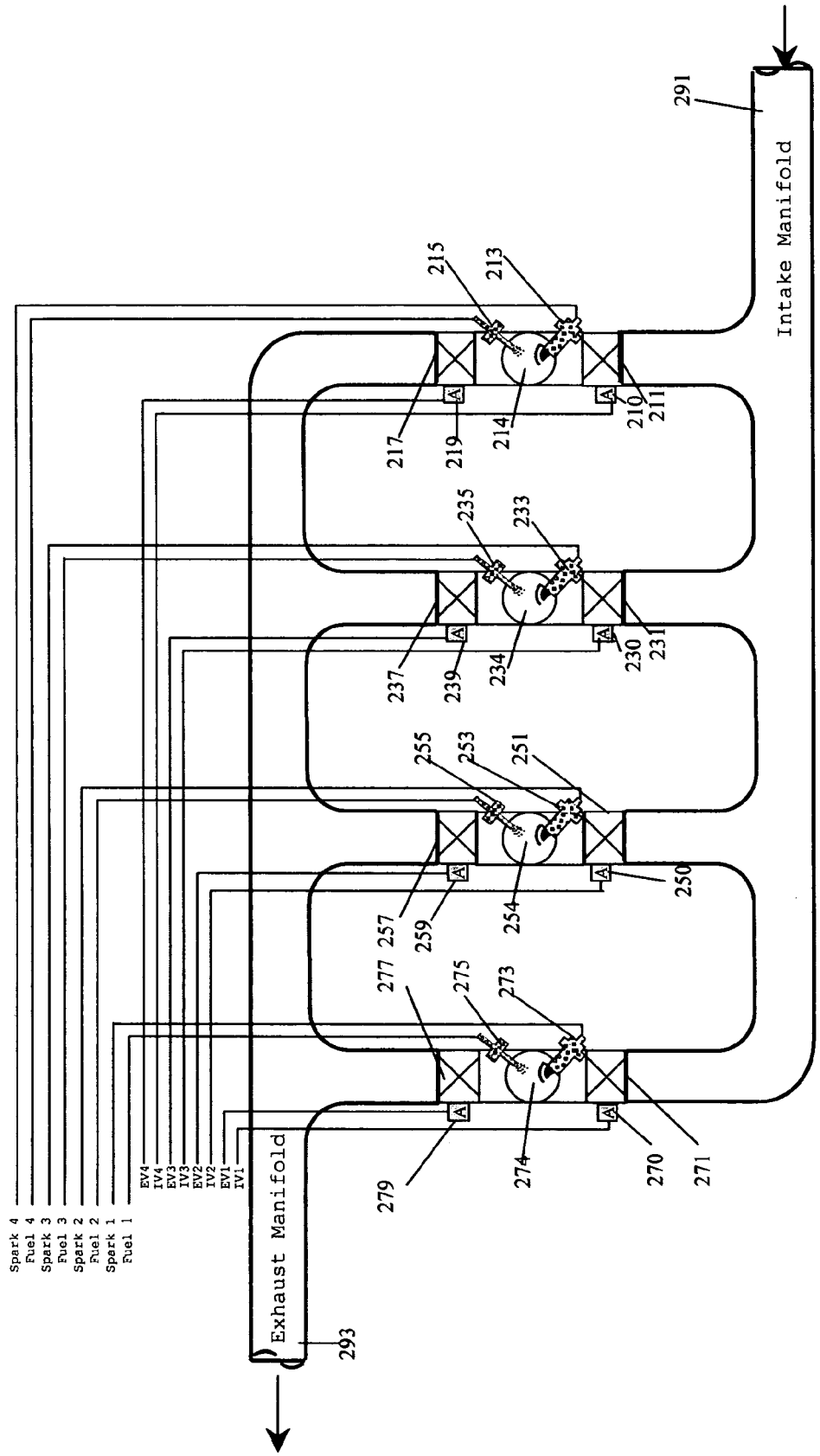
FIG. 2 is a high-level engine system diagram of a VCRICE engine in accordance with an embodiment of the present invention.
Figure 3:
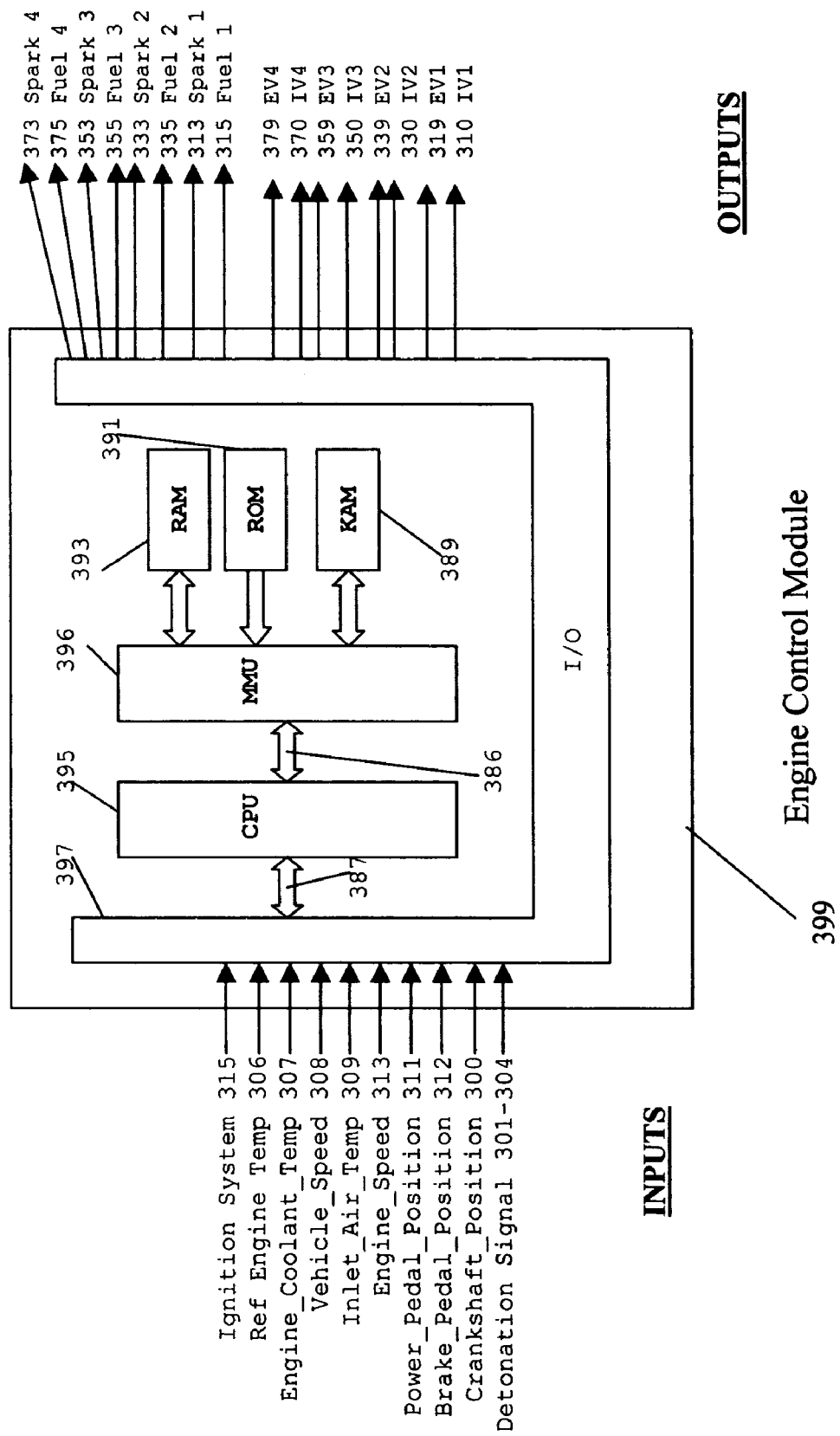
FIG. 3 shows inputs and outputs of a high level VCRICE control module controller block diagram in accordance with an embodiment of the present invention.

FIG. 1 is an engine block cutout view illustrating an internal combustion engine cylinder unit in accordance with an embodiment of the present invention. The cylinder 106, cylinder ring 108, piston 104, detonation sensor 102, cylinder expandable volume 105, exhaust valve 117 and air inlet valves 111, fuel injector 115, fuel mixture igniter 113, air intake 191, exhaust manifold 193, electronic actuation devices 110 119 comprise a Cylinder-Piston Compression-Power Unit (CPCPU) in a preferred embodiment. These components are independently operated under a computer control system. Specifically, a CPCPU is controlled by electronic fuel injection, means for igniting a fuel air mixture, electronic means of controlling outlet and inlet valve states. Shown in FIG. 2 and FIG. 3, are internal and external sensors under electronic control that take and deliver signals to cylinder components operating under programmable logic in compute readable storage medium under processor control.

Other embodiments of the invention use piston-cylinder configurations such as in a rotary engine, where the cylinder is exchanged for a conformable volume which functions in similar fashion to rotate a crankshaft upon gas expansion. The present invention can be adapted to CPCPUs working in-line, opposed, vee, or radial configurations.

Camless Electronically Controlled Inlet and Exhaust Valves

Camless intake and exhaust valves under electronic control are used to control cylinder fuel-mixture state temperature and pressure. Valve motion can be effectuated electronically in several ways, the leading designs use solenoid actuation or fast-acting electro hydraulic. In a preferred embodiment of the invention, the inlet 111 and exhaust 117 valves use solenoid actuation 110 119 respectively. In another embodiment, a fast-acting electro hydraulic actuator under the control of an electronically controlled digital valve is used to provide the mechanical power for valve actuation. Engine inlet and outlet valves and associated electronic actuators are CPCPU specific components whose open-close states are controlled by a computer control system using duty cycles defining component states as functions of piston position.

Fuel-Air Mixture Ignition

In an aspect of the invention, shown in FIG. 1, the fuel-air mixture ignition is selectable and can be accomplished through spark ignition (SI), compression ignition (CI) or homogenous charge compression ignition (HCCI). In an SI embodiment CPCPU, the fuel mixture igniter 113 receives a signal to ignite the fuel-air mixture in power mode generally near top dead center (TDC) of the power stroke. In this embodiment of the invention, a solid-state electronic ignition system is used in conjunction with electronic sensor signals and feedback signals to a central ignition module to produce a spark of a precise duration and time to a particular CPCPU in accordance with the engine mode and associated timing required for the SI mode. These are known to one skilled in the art and provide the means to introduce spark to ignite the air fuel mixture by computer control.

In a CI embodiment, ignition time is determined for a selected fuel injection time. These are controlled electronically by valve open-close states in accordance with programmed cycles, fuel injection time, and with additional secondary factors such as fuel burn rate and flame front formation also affecting ignition timing.

In a HCCI embodiment, ignition time is determined for a selected compression ratio. These are controlled electronically by valve open-close states in accordance with programmed cycles, compression ratio calculated and valve states determined for a particular fuel, and with additional secondary factors such as fuel burn rate also affecting ignition timing.

4-CPCPU VCRIC Engine Embodiment

FIG. 2 is high-level diagram of a 4 CPCPU VCRIC engine in accordance with an embodiment of the present invention. By de-coupling the four stroke power cycle and re-configuring the timing of the cylinder valve component states, and such things as duration and volume of fuel injection and spark, this embodiment provides a variable compression ratio per individual cylinder unit.

In the invention embodiment shown in FIG. 2, cylinders 214 234 254 274 receive intake air from ambient air manifold 291. In power mode, cylinders work under a firing sequence that is controlled by programmable control logic, which will accommodate a host of factors. This is notably distinguished from a preset unchangeable firing sequence constrained by mechanical design.

In a VCRIC embodiment, CPCPUs are operated independently, but substantially similarly individually during a given power mode. In a power mode utilizing all CPCPUs, intake air passes through the inlet valves 211 231 251 and 271 which are independently processor controlled through actuators 210 230 250 and 270 respectively to determine compression ratio for each individual CPCPU. Inlet ambient air is mixed with fuel from injectors 215 235 255 and 275 respectively under processor control. The power stroke can be initiated with the compressed air-fuel mixture ignited by processor-controlled ignition through spark initiators 213 233 253 and 273 respectively, fuel injection time, or by determining compression ignition time. This is done in accordance with a computer controlled firing sequence. This drives the pistons to impart rotational energy to the crankshaft for power. Exhaust valves 217 237 257 277 are independently processor controlled through actuators 219 239 259 and 279 respectively and are opened to vent exhaust gas to exhaust manifold 293.

Except for the crankshaft imposing piston reciprocation timing, the valves are independently controlled so that each cylinder obtains just the volume of intake air which corresponds to the volume of air which when compressed to the volume above the piston will provide the programmed compression ratio. The temperature profile of the engine is not flat and because cylinder temperatures differ along with cylinder pressures, independent control of individual cylinder units is required to achieve selected compression ratio for individual cylinder unit pressure and temperature states. Thus it is necessary to receive piston position and engine speed to synchronize with valve state timing and open state duration.

Engine Controller

Current model automobiles and trucks use multiple processors and some vehicles have thousands of lines of software or program code. There are many engine computer programming environments which those skilled in the art use to program aspects of the invention: the engine control system, stoiciometry tables in digitized logic, empirical ignition parameter graphs, mode duty cycles program logic and various other program logic. The engine control system is comprised of input sensors, electronic control modules to process the signals from those sensors, and stored logic to convert output signals into physical action via mechanical actuators. A control module, referred to herein as computer or controller, can be comprised of such components as CPUs, controllers, micro controllers, processors, microprocessors, memory and/or other electronic or optical hardware.

FIG. 3 shows engine control module 399 for an embodiment of the present invention for a VCRIC engine on a vehicle and associated inputs and outputs from devices and sensors. As shown in FIG. 3, the engine control module 399 includes a computer or central processing unit (CPU) 395 in communication with computer readable storage devices 389, 391, and 393 via memory management unit (MMU) 396. The MMU 396 communicates data (including executable code instructions) to and from the CPU 395 and among the computer readable storage devices, which, for example may include read-only memory (ROM) 391, random-access memory (RAM) 393, keep-alive memory (KAM) 389 or other memory devices required for volatile or non-volatile data storage, via data buses 387 and 386 of any suitable configuration. The computer readable storage devices may be implemented using any known memory devices such as programmable read-only memory (PROM's), electrically programmable read-only memory (EPROM's), electrically erasable PROM (EEPROM's), flash memory, or any other electrical, magnetic, optical or combination of memory devices capable of storing data, including executable code, used by the CPU 395 for controlling the internal combustion engine and/or motor vehicle containing the internal combustion engine.

Input/Output

Input/output (I/O) interface 397 is provided for communicating with various sensors, actuators and control circuits, including, but not limited to, the inputs shown in FIG. 3. These inputs include device and sensor signals such as, Cylinder Detonation Signal 301 302 303 304, Ignition System 315, Reference Engine Temperature 306, Engine Coolant Temperature 307, Vehicle Speed 308, Inlet Air temperature 309, Engine Speed 313, Power Pedal Position 311, Brake Pedal Position 312, and Crankshaft Position 300. Individual CPCPU temperature signals are not shown but may also be calculated from the Reference Engine Temperature 306 and know engine temperature profiles. Input signals are used as real-time variables in conjunction with the programmed duty cycle and mode logic to control the CPCPU components in concert with cylinder unit piston position for creating variable compression.

The engine controller module 399 receives signals from a variety of sensors, such as the sensors discussed above, and controls operation of CPCPU components through outputs which control the states of the Fuel Injectors 315 335 355 375, Inlet Valves 310 330 350 370, Exhaust Valves 319 339 359 379, Spark 313 333 353 373, analogous to a FIG. 2 embodiment CPCPU components. These outputs include Spark_4 373, Fuel_4 375, Spark_3 353, Fuel_3 355, Spark_2 333, Fuel_2 335, Spark_1 313, Fuel_1 315, EV4 379, IV4 370, EV3 359, UV3 350, EV2 339, UV2 330, EV1 319, IV1 310 where Spark_n represents the control line to the sub-module ignition for cylinder n, Fuel_n represents the control line to actuator assembly fuel injector in cylinder n, EVn represents the control line to actuator assembly camless exhaust valve in cylinder n, and IVn represents the control line to actuator assembly camless inlet valve for cylinder n.

The control and operation of CPCPU component states varies in accordance with the mode requirements, sensor input and engine parameters. Although CPCPU embodiments of the invention are described with components as having Boolean states of open/closed or on/off, this is done for illustration of simple cycle of operation purposes. In practical fact, this would be an approximation and the physical reality of moving engine components, even though electronically controlled and actuated, is that components have state transition characteristics, properties and response profiles which impact the duty cycle timing. Optimum operational results may require initiating component state transitions before top dead center (TDC) or after TDC and in accordance with engine parameters. This would apply to bottom dead center (BDC) stroke starts as well. Valves and other mechanical components have characteristic open and close profiles. Latencies from command execution to completed mechanical state transition must be addressed in any real application of the invention. Therefore, the component open/close duty cycles and timing curves may appear substantially different from those illustrating the simple fundamental modes of operation which when implemented may appear different.

Sensors and devices provide information about engine operating parameters that affect the operation of the vehicle, the engine and engine mode of operation. The term "engine operating parameters" herein refers broadly to any engine operating parameter, including but not limited to engine operating parameters, which are sensed, computed, derived, extrapolated from empirical tables, inferred or otherwise provided. As example, the reference engine temperature sensor 306 provides sensed engine temperature data. Using stored temperature profiles as functions of engine operation times from zero to steady state, individual cylinder unit temperatures can be extrapolated and calculated. Hence they are all engine operating parameters.

Along those lines is the concurrency of processing inputs and outputs and the need to minimize the delay between processing and actuating components within real-time operating constraints. In more advanced embodiments of the invention, computational power may require that signals be preprocessed by adjunct processors such as DSPs or microcontrollers and compared with data from previous related tests. Other processing requiring the use of empirical data or other numerical processing logic may include embodiments with additional numerical processors and memory hardware, acting more locally for computational need and or speed for real-time considerations. Lastly, complex actuated components may themselves have local assemblies with analog-to-digital or digital-to-analog circuits, controllers, programmable logic controllers, micro controllers, soft logic controllers and or processors for a more local, failsafe or immediate control of the managed engine component. These are all part of the distributed computer control system and act together to manage aspects of the invention.

The engine controller 399 is a portion of the computer control system, which comprises computer readable program code embodied in a computer usable medium. The readable program is executable code and programmable logic residing in various modules and sub-module component hardware. The programming and firmware embedment process is well known to those of ordinary skill in the art. The programmable portion will store engine parameter information for determining component states for operation.

The Variable Compression Stroke

Figure 4:
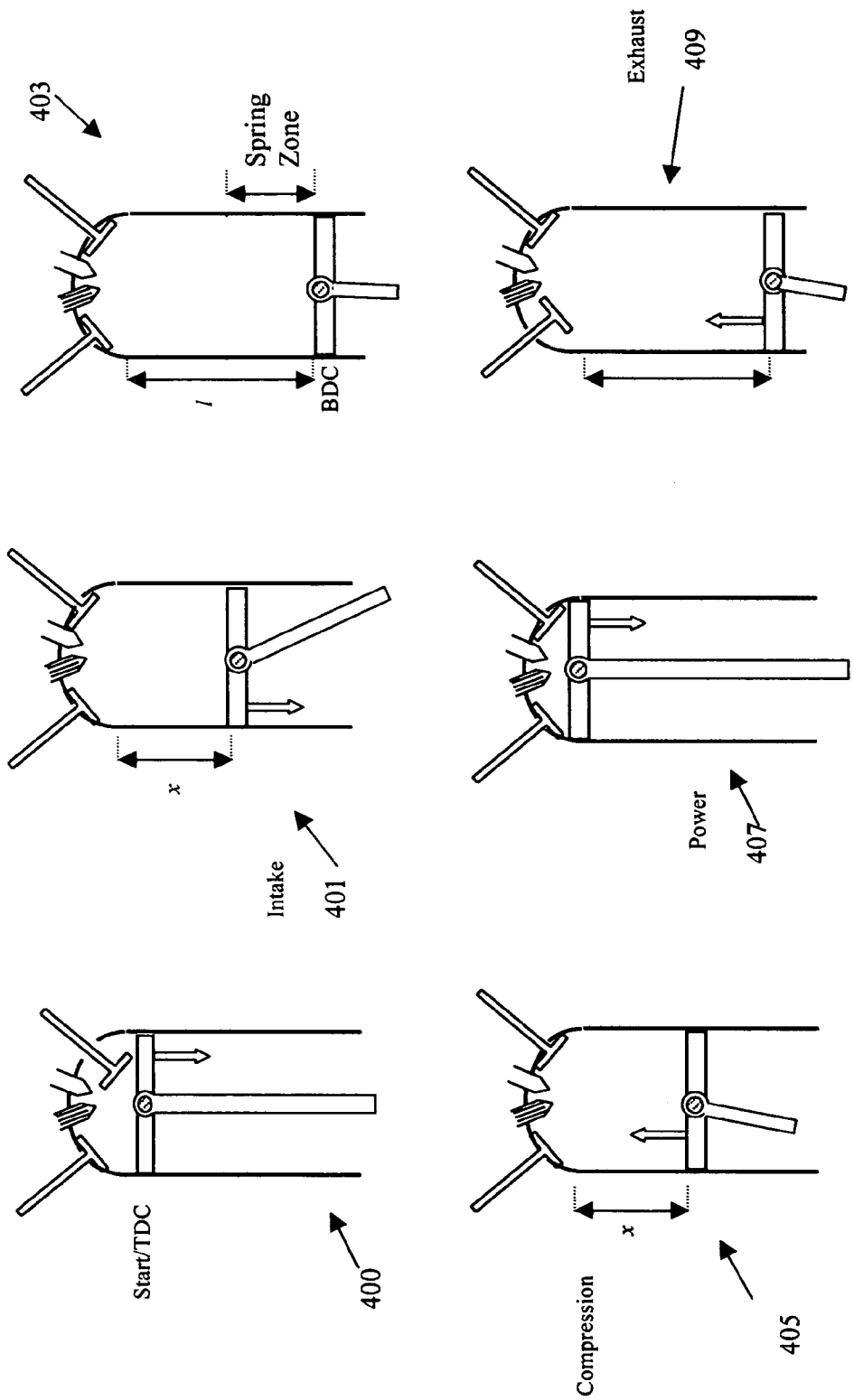
FIG. 4 diagram illustrates a variable compression ratio stroke sequence of a VCRICE according to an embodiment of the present invention.

FIG. 4 is a schematic diagram illustrating the variable compression ratio internal combustion (VCRIC) stroke sequence according to an embodiment of the present invention.

The compression ratio of an internal combustion engine is typically defined as the ratio of the volume in a cylinder above a piston when the piston is at bottom-dead-center (BDC) to the volume in the cylinder above the piston when the piston is at top-dead-center (TDC). This definition holds loosely for the typical four-stroke engine cycle because the intake valve is opened generally through out the intake stroke and closed generally thereafter. Thus compression ratio can just as well be defined as the ratio of volume open to draw in ambient air during the intake valve open state compressed to the volume above the piston when the piston is at TDC.

Following this thread of reasoning, in an embodiment of the invention the air drawn into the cylinder occurs only as long as the intake valve remains open and the exhaust valve is closed, thus forming a virtual cylinder. The intake valve component is electronically controlled to remain open for the programmed duration while the piston travels a length X 401. Upon intake valve close, the piston continues to travel towards BDC to complete the stroke without more air drawn in. Typically, closing the intake valve at BDC of intake stroke will allow a known volume of air in the cylinder to provide the largest compression ratio; the volume swept out by the piston during air intake plus the volume above the piston at TDC divided by the volume above the piston at TDC. To obtain a compression ratio other than the engine fixed design maximum, the intake valve would be closed at some length X 401 before the piston reached BDC 403. In other embodiments, the intake valve would open at other than TDC and be closed at some point calculated to achieve the selected pressure ratio. It is the duration of the intake open state in responsive to the piston travel that determines the filled volume and hence the compressible fluid within the compressible volume. Since this embodiment of the invention employs electronically computer controlled valves, the timing and duration of valve states is precisely controlled and depend on engine parameters and control logic, not by fixed timing camshafts or mechanical variants.

Upon reaching BDC 403 the piston will not begin compressing the drawn air until it reaches the point of intake valve closure on compression stroke 405 after which it will compress the air or air fuel mixture until TDC for a subsequent power stroke 407. Power stroke will continue for the full length of the stroke 409 after which the exhaust stroke will begin. By maintaining the power stroke length through the entire available stroke length, the cylinder can use the effective pressure from combustion during each power stroke longer than a comparable mechanical variable compression scheme, and thus produce more power on every stroke than a comparable variable compression engine. The exhaust stroke begins substantially near BDC 409 whereupon the exhaust valve is opened to exhaust the combusted fuel.

Intake Open as Function of Compression Ration Provided

Figure 5:
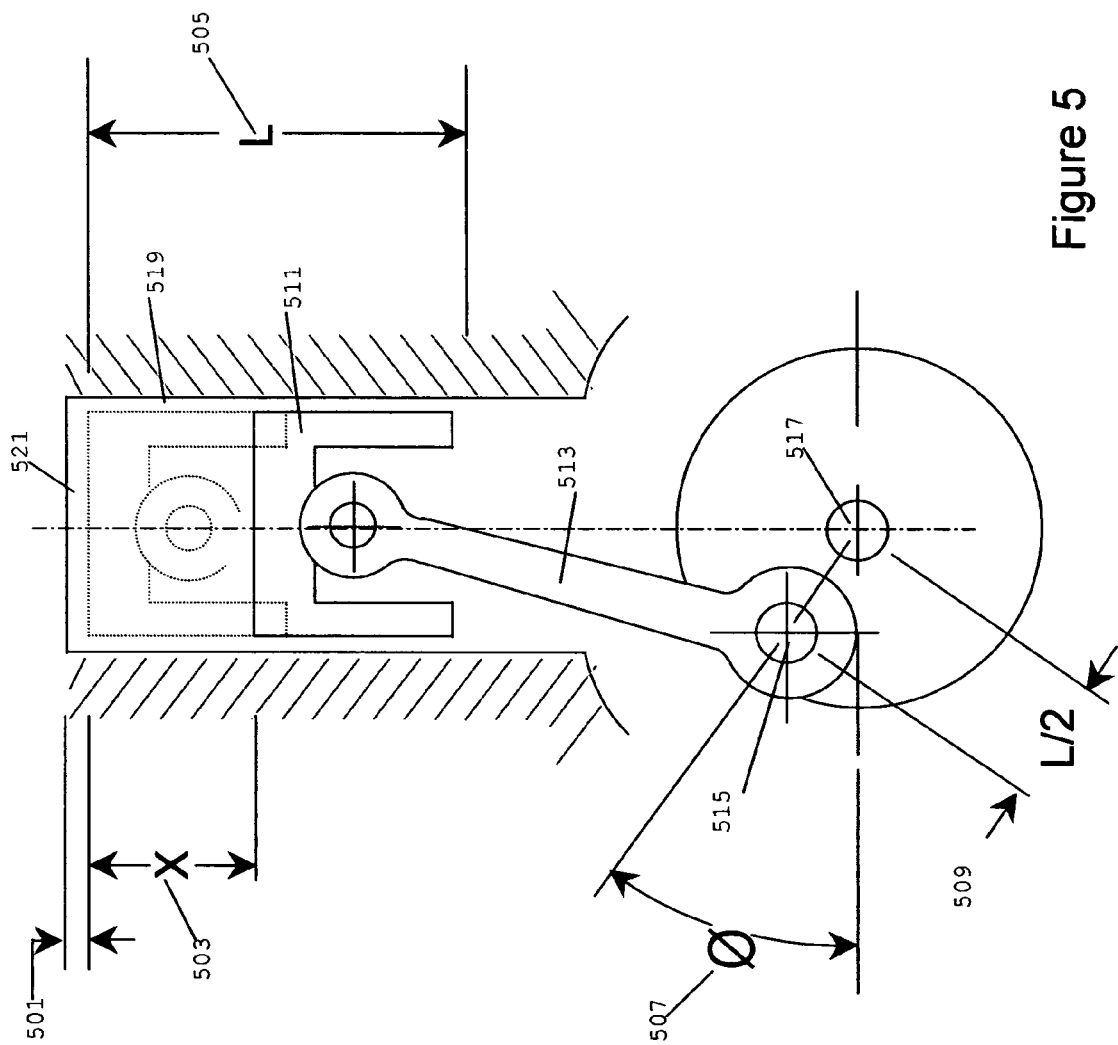
FIG. 5 illustrates the relationship of crank angle position to compression ratio in a VCRICE in accordance with an embodiment of the present invention.

FIG. 5 illustrates VCRIC intake valve open state relationship to compression ratio in accordance with an embodiment of the present invention.

The linear distance from above TDC 501, is representative of the volume 521 above piston at TDC, Piston Travel Compression Length (PTCL) X 503, angle theta 507 is corresponding to X 503 (PTCL), piston 511, recipricating in cylinder 519, piston 511 attached to connecting rod 513 which is itself attached to crankpin 515 which provides mechanical advantage to crankshaft 517. The full piston stroke L 505 is twice the corresponding crank radius 509 which is the length from the crankpin 515 centerline to the crankshaft 517 centerline.

On intake stroke, starting at TDC, the intake valve is open and the piston travels from TDC to the close of intake valve, and continues to BDC. The remainder of intake stroke, the portion of piston travel towards BDC when the intake valve is closed, is called the "spring zone". This same partial intake stroke length, from the point where the intake valve was closed and through to BDC ("spring zone"), is then reversed towards TDC on beginning of compression stroke. This portion of the compression stroke only compresses the intake air rarefied in the spring zone to ambient pressure when the piston reaches the intake valve close point, only after which actual air compression above ambient pressure begins. The portion of the intake and compression strokes in the "spring zone," where air is rarefied and then compressed to ambient pressure creates a temporary vacuum expected to incur frictional cylinder losses without appreciable parasitic power loss. No additional air is taken into the cylinder during the volume swept by the piston in the spring zone. Compression on compression stroke is produced from the point that the intake valve was closed on intake stroke to the TDC of the compression stroke. This yields a compression ratio of cylinder volume swept out by piston during intake valve open duration to the volume above the piston when the piston was at TDC, forming a virtual cylinder for compression.

The spring zone offers an advantage over other variable compression ratio schemes, that being the power stroke is not constrained by the intake or compression stroke effective lengths. The power stroke applies torque through the full crank radius length and therefore full piston travel stroke to transmit power to the crankshaft. Thus, the power stroke extracts more work from the fuel combustion energy than the case where the compression and power strokes are of equal length. The exhaust stroke likewise has more relative time to exhaust combustibles than a cycle whose exhaust stroke was constrained to the compression stroke time.

The typical cylinder configuration of the piston to rod and crankshaft rotation, a linear volume swept out by the piston travel has a sinusoidal relationship with the valve timing and duration.

For illustration purposes, a cylinder with maximum compression ratio of L+1:1, where the length of the cylinder and also the piston volume sweep for stroke length L, the (L)*(Cylinder Cross Area) equals the volume compressed into the volume above the piston at TDC. In the intake valve fully open scenario, the maximum valve open time corresponds to 180° of crankshaft rotation and provides the highest compression ratio for the cylinder configuration and design. However, where the volume of ambient air drawn in on intake stroke occurs during the Drawing Fraction of the Stroke Crankshaft Angle (DFSCA) theta 507, the intake valve open duration during the intake stroke, that volume provides the amount of ambient air to be compressed. In a fundamental cycle of operation, as here, the intake air begins to be drawn in at piston TDC, the valve open duration is related to the DFSCA as a function of piston travel ratio (PTR) by:

DFSCA=arc cosine (1−2*PTR)

Where PTR=Piston Travel Ratio, Length of Piston Travel from TDC/Total Stroke Length
DFSCA is Intake Valve Open Angle, the degrees from TDC where Intake Valve is in open state; angle of crankshaft arc corresponding to intake valve open duration
Actual intake valve open duration depends on engine speed and DFSCA.
Where DT1 is the intake valve open state duration period for the above embodiment:

DT1=(Stoke/Rev)×(DFSCA)/(Engine_Speed)

Compression Ratio vs. Valve Open Crank Shaft Angle

FIG. 6 is a table relating VCRICE compression ratio with corresponding piston travel ratio and intake valve open angle as open from TDC in accordance with an embodiment of the present invention and the formulation above. The maximum compression ratio of the embodiment is 21:1. The volume to be compressed is the volume above the piston at TDC and is unity for ease of illustriative calculational purposes only. This volume is thus not constrained to unity by design. The Intake Valve Open Angle (IVOA) 605 is given as calculated for a given Compression Ratio (CR) 601 in roughly 2 unit increments of CR. This is also for illustrative purposes and the precision or degree of accuracy in achieving any given compression ratio within the cylinder design range is not constrained in any manner by this table. The Piston Travel Ratio (PTR) 603, (Length of Piston Travel from TDC)/(Total Stroke Length), illustrates the degree of a full piston cylinder design stroke required for a particular desired compression ratio.

Figure 7:
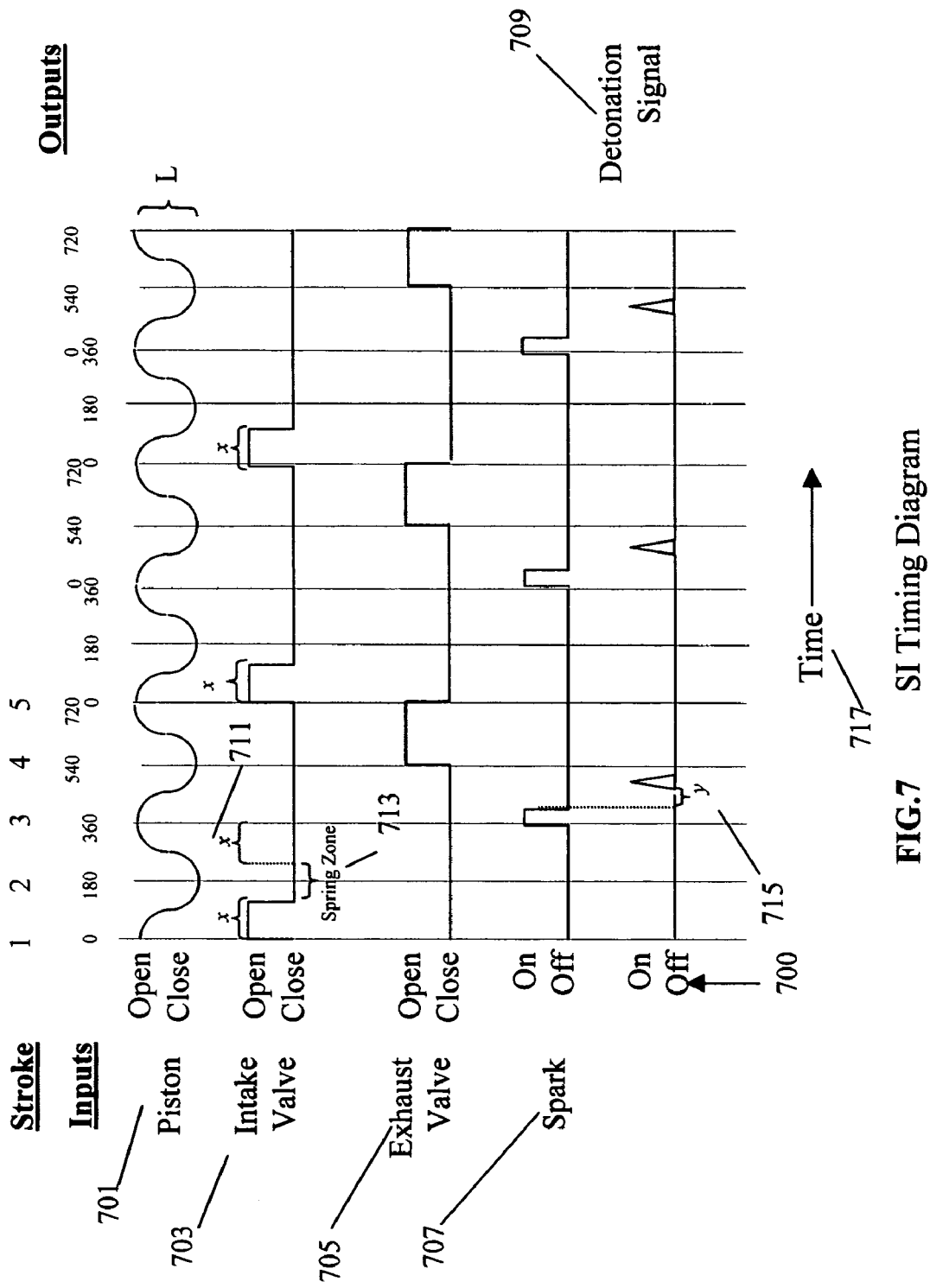
FIG. 7 is a timing diagram illustrating a Spark Ignition (SI) stroke sequence of a VCRICE according to an embodiment of the present invention.

Where:
CR 601=Compression Ratio for maximum 21:1 cylinder with 1 unit of volume above TDC
PTR 603=(Length of Piston Travel from TDC)/(Total Stroke Length)
IVOA 605=arc of Intake Valve open in degrees from piston TDC SI Variable Compression Ratio Mode FIG. 7 is a Timing Diagram illustrating a SI stroke sequence for a power cycle according to an embodiment of the present invention.

Variable compression can be used in different ignition modes to create crankshaft power. FIG. 7 is a SI Timing Diagram illustrating a Power Mode according to an embodiment of the present invention for a power cycle using spark ignition (SI). FIG. 7 shows the state positions 700 and duty cycles corresponding to a CPCPU piston 701 stroke, intake valve 703, exhaust valve 705, spark 707, and detonation signal 709 as functions of time 717 during power cycle in accordance with an embodiment of the invention.

In this embodiment, starting on intake stroke 701 0–180, the piston 701 travels from Top Dead Center (TDC) to it's fully extended stoke length L 702 at Bottom Dead Center (BDC). The intake valve 703 is open during this stroke for a period X 711 after which the piston continues to complete the stroke expanding the volume with the intake valve 703 closed. During the intake stroke the exhaust valve 705 is closed and the spark 707 is off. Since the compression ratio is dependent on intake valve open duration on intake stroke, which is controlled by programmed logic, fuel injection time and quantity would also be controlled by a discrete or continuous function of intake valve open duration, implementable by one skilled in the art. In an embodiment of the invention, the fuel would be injected at commencement of intake stroke for low compression ratio, lower intake valve durations, and before a spontaneous combustion pressure, the fuel would be injected just prior to spark initiation at end of compression stroke.

The second stroke 701 180–360, is the compression stroke. On compression stroke 701 180–360 the intake valve 703 stays closed for the full stroke duration but compression over ambient air pressure does not begin until the point of intake valve 703 closure on intake is passed. The volume from the point of intake valve closure to BDC is called the "spring zone" 713 as first it is rarefied and then compressed back to ambient pressure applying a nominal springing effect on the piston 701 before the piston does any appreciable work compressing the drawn air during the period X 711 to its maximum pressure at piston 701 TDC.

The third stroke 701 360–540 is the power stroke. While all the cylinder valves 703 705 are closed, ignition means by spark 707 ignites the compressed air-fuel mixture and the pressure of the gases of combustion forces the piston 701 to expand the cylinder volume and in doing so imparts rotational energy to the crankshaft. The power stroke pushes the piston 701 the full length of the stroke, exceeding the stroke length of the compression ratio for all compression ratios up to the maximum mechanical design compression ratio.

The fourth stroke 701 540–720 is the exhaust stroke. The exhaust valve 705 is opened while all the other valves 703 remain closed and the piston 701 pushes the spent gas past the exhaust valve 705 port clearing the cylinder and completing the cycle.

In spark ignition (SI) engines, the primary control mechanism for mixture ignition is through a spark at approximately TDC adjusted to detonate before TDC to minimize knock and other adverse affects. A detonation signal 709 is received from a sensor and processed, to determine if optimum ignition parameters are met, while accounting for electronic and processing latencies. The spark ingnition timing is advanced or retarded to account for factors such as engine load, fuel octane level and compression ratio. Since an aspect of the invention creates a desired compression ratio above that which would ordinaraly spontaneously ignite the mixture, additial ignition control parameters would be necessarily applied as known by those skilled in the art to prevent pre-ignition or knocking. Such methods would include fuel injection at ignition time as in cetane fuel using engines, or advancing-retarding spark to eliminate pre-ignition where small incremental compression ratio changes can effectuate the proper time for ignition.

A simple method of coordinating ignition with higher compression ratios would be to use a threshold of compression ratio above which fuel injection and spark ignition would act in concert and below which the spark ignition timing would act conventionally.

Program Snippet for an Individual Cylinder Power Cycle

As above, each CPCPU has associated components that are identified by CPCPU and an identifying number n of CPCPU as CPCPU_n. In the psudo code snippet below, the CPCPU_n is associated with IVn, EVn, Spark_n, Fuel_n, ICVn, corresponding to the Inlet Valve, Exhaust Valve, Spark, and Fuel injection respectively for the nth CPCPU. The function Schedule_at( ) is program logic executed in real-time and relies on real-time sensor data as well as preset variables, constants and programmable logic to determine which CPCPU component states to adjust in accordance with applicable mode duty cycles and at the prescribed time. In the most basic fundamental mode, PISTON_TOP_OF_STROKE−$1^{st}$ will be the time at TDC for the CPCPU_N piston, which is based on a known crankshaft position to determine an individual CPCPU piston position as it reaches TDC. Component state durations are partially based on engine speed (RPM), a real-time input parameter from sensor signals, and component specific characteristics, which determine constants and duty cycle durations. For example, the inlet valve 711 duty cycles are depicted as relatively vertical steps up and down with flat duration during the full stroke period. This is a simple ideal depiction made for demonstrative purposes, as current valve characteristics generally require that the valve be opened BTDC and closing overlapping with other valve openings and with valve open-close locus typically overlapping sinusoids. Furthermore, the stroke time or cycle duration is based on engine speed and other factors used to calculate component state durations. A simple ideal psudo code snippet for SI power mode would be:

```
Power_Mode_for(CPCPU_N)
{
  Schedule_at(PISTON_TOP_OF_STROKE_1st, CPCPU_N)
  {
    Dispatch_Exhaust_Valve_Close(CPCPU_N);
    Dispatch_Inlet_Valve_Open(CPCPU_N, T1, DT1);
    IF(Engine_Speed > 2000)
       Dispatch_Fuel_Injection_On(T3, DT3);
  }
  Schedule_at(PISTON_BOTTOM_OF_STROKE_2nd, CPCPU_N)
  {
  }
  Schedule_at(PISTON_TOP_OF_STROKE_3rd, CPCPU_N)
  {
    IF (Engine_Speed <= 2000)
       Dispatch_Fuel_Injection_On(T3, DT3);
    Dispatch_Spark_Ingnition(CPCPU_N, T4);
  }
  Schedule_at(PISTON_BOTTOM_OF_STROKE_4th, CPCPU_N)
  {
    Dispatch_Exhaust_Valve_Open(CPCPU_N, T2, DT2);
  }
}
```

Where Tx are the time after TDC that the component starts open or closed state

T1=0 typically initially

T2=0 typically initially

T3=0 typically initially

T4=0 typically initially

Where DTx are the duration times calculated

Drawing Fraction of the Stroke Crankshaft Angle (DFSCA)

$DT1=(Stoke/Rev) \times (DFSCA) \times \times (60)/(Engine\_Speed)$ $DT2=(Stoke/Rev) \times (Fraction\ of\ EV\ stroke\ duty\ cycle) \times (60)/(Engine\_Speed)$ $DT3=(Stoke/Rev) \times (Const1) \times (func(Injection\ Pressure))/Engine\_Speed)$ Const1=Fuel Injector constant Stroke/Rev=stroke period per crankshaft revolution Engine_Speed=engine RPM In a SI power mode embodiment, an aspect of the invention provides programmed computer control actuation of cylinder unit component states in conformity with programmed power mode duty cycles responsive to engine power demand requirements, engine RPM and cylinder unit piston position. Component state duration times DT1, DT2, DT3 are determined by controller calculations and embedded logic executed in real-time from formulations based on vehicle operating parameters such as engine speed, cylinder temperature, detonation time, detonation intensity and also in accordance with duty cycle characteristics. Fuel injector duration in open state, DT3, has an additional duration which models the flow characteristics of the particular injector device and in this embodiment can be based on pressure but will generally have many engineering characteristic parameters to be taken into account in calculating the optimal duration time. In addition, the above code logic demonstrates a simple change in injection time for a discrete load change at 2000 RPM. Furthermore and generally, these types of simple formulations and calculation methods are thus applied to other modes of ignition in calculating component open or close state durations and are related in time to associated piston strokes and positions.

In power-generating modes, the engine ignition order and timing is changeable by programming logic for scheduling cylinder unit stroke sequences and real-time engine parameters. The changes are effectuated by setting select cylinder unit component states such that cylinder unit strokes sequence independently of other cylinder units while maintaining cylinder unit piston position compatible, or in concert with, crankshaft rotation. Cylinder ignition order is changed to achieve various means and purposes in engine power and load distribution. Cylinder ignition timing is changed to achieve optimal combustion with a particular compression ratio. For example if, one cylinder is burning 5° C. hotter than other cylinders, its compression ratio may need reduction independently of the other cylinders. Hence its intake valve open duration would be reduced proportionately to comply with a need to reduce cylinder temperature to more optimally combust fuel in that particular cylinder independently of all other cylinders.

Cylinder Unit Coupled with Control System

Figure 8:
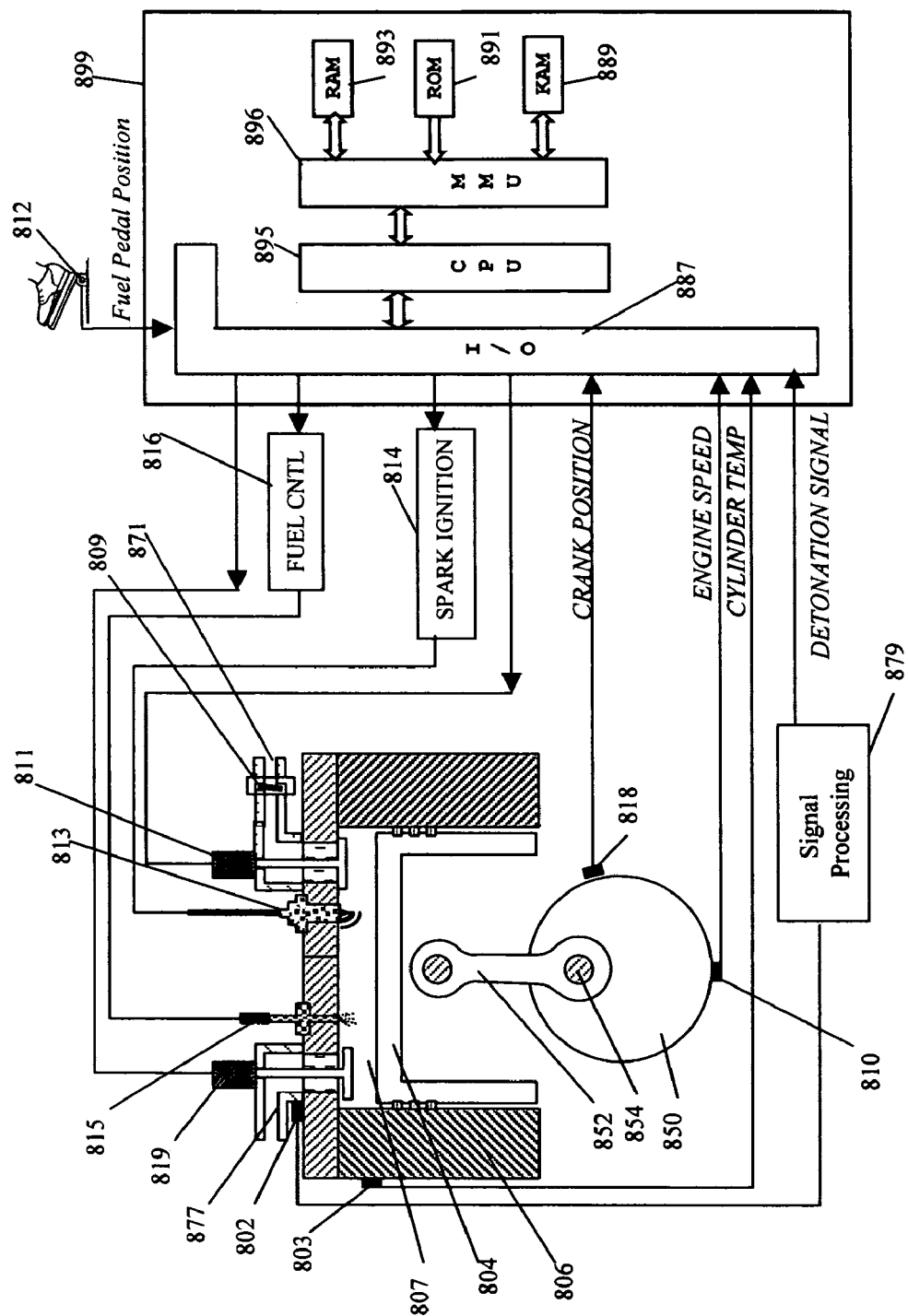
FIG. 8 is a schematic of a vehicle having a VCRICE and an engine control system for controlling the VCRICE according to an embodiment of the present invention.

FIG. 8 is a schematic of a vehicle having a VCRIC engine and an engine control system for controlling the VCRIC engine in accordance with the present invention. As will be appreciated by those of ordinary skill in the art, the present invention is independent of the particular underlying engine configuration and as such can be used with a variety of different internal combustion engines having different engine configurations and engine parameters. An engine, for example, can be constructed and arranged with one or multiple cylinders with SI, gasoline or other fuels. Similarly, the present invention is not limited to any particular type of apparatus or method required for changing the operating stroke sequences of individual cylinder units or altering the cylinder firing order of the cylinder units of internal combustion engines.

Referring again to FIG. 8, the engine includes a plurality of cylinders (only one shown), each cylinder 806 having a combustion chamber 807, a reciprocating piston 804, cylinder temperature sensor 803, electronic intake valve actuator 811, electronic exhaust valve actuator 819, ambient air inlet 871, and cylinder exhaust 877 outlet. The piston 804 is coupled to a connecting rod 852 which itself is coupled to a crankpin 854 of a crankshaft 850. Fuel is injected to the combustion chamber 807 via a fuel injector 815 and is delivered in quantities metered by an electronic driver circuit 816 under commands from the engine control system 899 (or equivalent). Ambient air 871 is nominally drawn in through an intake check valve 809. Ignition spark is provided to ignite fuel-air mixture via spark plug 813 and ignition system 814 in accordance with a spark advance (or retard) signal from the electronic controller 899 in response to, but not limited to, engine detonation signal 802 from detonation sensor. Fuel mixture ignition can also be obtained by spontaneous combustion by compression of injected fuel/air as in a typical diesel engine.

As shown in FIG. 8, the engine controller 899 nominally includes a microprocessor or central processing unit (CPU) 895 in communication with computer readable storage devices 893, 891 and 889 via memory management unit (MMU) 896. The MMU 896 communicates data (including executable code instructions) to and from the CPU 895 and among the computer readable storage devices, which for example, may include read-only memory (ROM) 891, random-access memory (RAM) 893, keep-alive memory (KAM) 889 and other memory devices required for volatile or non-volatile data storage. The computer readable storage devices may be implemented using any known memory devices such as programmable read-only memory (PROM's), electrically programmable read-only memory (EPROM's), electrically erasable PROM (EEPROM's), flash memory, or any other electrical, magnetic, optical, wireless or combination of memory devices capable of storing data, including executable code, used by the CPU 895 for controlling the VCRIC engine and to some extent the vehicle hosting the VCRIC engine. Input/output (I/O) interface 887 is provided for communicating with various sensors, actuators and control circuits, including but not limited to the devices shown in FIG. 8. Input devices include an engine speed sensor 810, crankshaft position sensor 818, cylinder detonation sensor 802, engine cylinder temperature 803, and power pedal position sensor 812.

Output command and control includes electronic fuel control 816, ignition control 814, electronic intake valve actuator 811, and electronic exhaust valve actuator 819. The operation and control of these components are known to those skilled in the art. The outputs are shown for one cylinder unit but would apply for each cylinder unit in the engine and are used to control the states for the cylinder components in concert with the associated piston to generate stoke sequences from programmed modes of operation.

The sensors shown provide information about events, conditions and operating parameters that affect the scheduling of cylinder component state actuation. The term "engine operating parameters" as above, refers broadly to any engine operating parameter, including those which are sensed, computed, derived, inferred or otherwise provided. Other sensors not listed in the present embodiment are not precluded from application by this invention. Modes of operation are comprised of engine component state configurations that define strokes in concert with the engine piston reciprocation. The controller 899 receives signals from engine operating parameters, processes stored logic and uses the parameters to schedule cylinder component state operation for variable compression in real-time.

The VCRICE is electronically controlled and driven, without hardware constraints such as camshfts, chains and belts to engage. Thus the VCRICE can operate in the reverse direction on demand. The engine crankshaft revolution direction change can be transitioned slowly by controlling the electronic valves to retard crankshaft revolution through cylinder unit suction or compression work or through commands to fire metered fuel quantities in cylinder units at strokes which would inhibit or slow pistion movement towards TDC. Once the crankshaft stops revolving in one direction, combustion of metered fuel quantities can serve to reverse direction and accelerate engine crankshaft. A reverse rotating engine crankshaft can eliminate the need for a reverse gear or provide reverse coupling in fluidic applications, for quick reverse without engaging a reverse transmission gear and thus reducing costs for such parts.

Thus, the above scenarios illustrate an aspect of the invention which provides means of altering cylinder compression ratios by receiving sensor data, accounting for control system latencies, determining component state timing and duration, and actuating components states to meet the determined conditions.

Although Spark Ignition engines are mentioned in some invention embodiments, the invention is equally applicable to Compression Ignition, Homogeneous Charge Compression Ignition and various fuel engines using combustable fuels such as hydrogen, propane, natural gas and other fuels. While this invention has been described and illustrated with reference to particular embodiments, it will be readily apparent to those skilled in the art that the scope of the present invention is not limited to the disclosed embodiments but, on the contrary, is intended to cover numerous other modifications, alterations, adaptions and equivalent arrangements that may be made by those skilled in the art without departing from the spirit and scope of this invention.

What is claimed is:

1. A variable compression ratio internal combustion engine comprising:
   one or more cylinder units each with expanding and contracting cylinder volume and associated stroke sequences;
   each cylinder unit having an electronically controllable intake valve component having multiple states under computer control;
   each cylinder unit having an electronically controllable exhaust valve component having multiple states under computer control;
   each cylinder unit having an electronic fuel injector component having programmable flow rate under computer control;
   each cylinder unit having an air-fuel mixture ignition means for igniting an air-fuel mixture in the cylinder volume, said ignition means under computer control;
   a computer usable medium containing the program control logic; and
   a computer control system comprising computer readable program control logic residing in the computer usable medium for controlling cylinder component states in concert with piston sweep of cylinder volume such that the swept cylinder volume corresponds to a virtual cylinder volume determined to yield a selected compression ratio,
   whereby the cylinder volume available for drawing air during the intake stroke draws in air volume which upon completion of the following compression stroke, yields a gas mixture with compression ratio equal to the selected compression ratio, wherein a cylinder unit intake and compression stroke sequence with a spring zone contained partially in the intake stroke and partially in the compression stroke for the purposes of allowing intake valve open duration variability for controlling volume of drawn air, wherein the spring zone comprises portions of strokes cylinder state pressure falls below the intake air pressure on the intake stroke segment following intake valve closure creating a rarefied mixture which is compressed to the target compression ratio on the subsequent compression stroke.

2. A variable compression ratio engine as in claim 1 further comprising a cylinder unit using spark ignition for air-fuel ignition means.

3. A variable compression ratio engine as in claim 1 further comprising a cylinder unit using compression ignition for air-fuel ignition means.

4. A variable compression ratio engine as in claim 1 further comprising a cylinder unit using homogeneous charge compression ignition for air-fuel ignition means.

5. A variable compression ratio internal combustion engine as in claim 1 further comprising transitioning cylinder unit component states to change engine crankshaft revolution direction.

* * * * *